United States Patent [19]

Okushi et al.

[11] Patent Number: 4,835,547

[45] Date of Patent: May 30, 1989

[54] THERMAL PRINTER WITH A MECHANISM FOR PREVENTING A RECORDING SHEET'S MEANDERING

[75] Inventors: Akira Okushi; Shigeharu Myogatani; Kazuhito Murata, all of Hyogo; Yoshitsugu Hamaguchi; Koichi Tanaka, both of Kyoto, all of Japan

[73] Assignee: Kanzaki Paper Manufacturing Co., Ltd., Tokyo, Japan

[21] Appl. No.: 117,232

[22] Filed: Nov. 6, 1987

[30] Foreign Application Priority Data

Nov. 10, 1986 [JP] Japan .......................... 61-173051[U]
Nov. 10, 1986 [JP] Japan .......................... 61-173052[U]

[51] Int. Cl.⁴ .......................................... G01D 15/10

[52] U.S. Cl. ................................ 346/76 PH; 346/70; 226/198; 226/23; 226/15; 226/17; 226/21

[58] Field of Search ............... 346/76 PH, 70; 226/15, 226/16, 17, 18, 19, 21, 23, 24, 27, 28, 196, 197, 198, 199

[56] References Cited

U.S. PATENT DOCUMENTS 2,722,415 11/1955 Wood, Jr. .......................... 226/198
4,174,171 11/1979 Hamaker et al. ..................... 226/23

FOREIGN PATENT DOCUMENTS 2407842 8/1975 Fed. Rep. of Germany ........ 226/21
0145956 11/1980 Japan .................................... 226/17
0090353 6/1982 Japan .................................... 226/15
0031851 2/1983 Japan .................................... 226/15
2844528 4/1979 Netherlands .......................... 226/17

OTHER PUBLICATIONS

Herron et al., "Web Steering Method and Apparatus", IBM Tech. Discl. Bulletin, vol. 14, No. 8, 01/72.

*Primary Examiner*—E. A. Goldberg
*Assistant Examiner*—Huan H. Tran
*Attorney, Agent, or Firm*—Cushman, Darby & Cushman

[57] ABSTRACT

A thermal printer with a mechanism for preventing recording sheet from meandering. In order to perform the mechanism, the thermal printer is provided with a thermal line head, a platen roller and a holding shaft which is perpendicular to the surface of a recording sheet and rotatable about the axis thereof, the holding shaft being engaged with the thermal line head in such a manner that the thermal line head is horizontally swingable about the axis of the holding shaft with the positional relation between the recording sheet and the thermal line head unchanged, and subjected to frictional force to return the thermal line head to its standard position, so that printing operation is correctly carried out all times and the recording sheet is returned to its standard position, that is, the meandering of the recording sheet is prevented. This mechanism also can be performed by providing the thermal printer with a brake shoe engaged with the holding shaft as described above.

7 Claims, 3 Drawing Sheets

THERMAL PRINTER WITH A MECHANISM FOR PREVENTING A RECORDING SHEET'S MEANDERING

BACKGROUND OF THE INVENTION

This invention relates to a thermal printer, and particularly to a thermal printer equipped with a mechanism for preventing a recording sheet's meandering.

In the case where data are recorded on a recording sheet with a thermal line head, the heat generating elements of the thermal line head locally heats the recording sheet to cause the latter to color. Therefore, when the printing density is high, the temperature of the recording sheet passing under the thermal printer head is raised to a considerably high value. As a result, the recording sheet is softened and thermally expanded to some extent.

This will be described in more detail. In the case where a pattern not in uniform in coloring density is printed with a thermal printer having a line head, the recording sheet is subjected to non-uniform thermal expansion and contraction, and therefore tension acting on the recording sheet becomes non-uniform in the widthwise direction of the recording sheet. Furthermore, the thermally expanded part or parts of the recording sheet are somewhat softened, thus being liable to be more expanded by the tension. As a result, the recording sheet passing through the printer head tends to move towards the side which is less expanded; that is, the recording sheet meanders. As a result, the printing position is displaced, and sometimes the recording sheet is creased, so that the resultant print is unsatisfactory.

For the purpose of preventing the recording sheet from meandering, heretofore the following methods are employed. For every printing operation, the line head is lifted to return the recording sheet to its correct position. Alternatively, a sheet edge position control device is employed which detects the position of the edge of the recording sheet so that, when the recording sheet is shifted, it is returned to its correct position. However, these conventional methods are disadvantageous in that the thermal printer is unavoidably high in manufacturing cost and large in size.

In addition, the following method has been known in the art: A roll with pins is used in such a manner that the pins are engaged with the perforations o a recording sheet to forcibly position the recording sheet thereby to prevent the meandering operation. However, the method is also disadvantageous in that, when the recording sheet is caused to meander greatly, the perforations are damaged.

SUMMARY OF THE INVENTION

An object of this invention is to eliminate the above-described difficulties accompanying a conventional thermal printer. More specifically, an object of the invention is to provide a thermal printer in which the meandering of a recording sheet is suppressed, and a printing operation is carried out correctly even if the recording sheet meanders more or less.

The foregoing object of the invention has been achieved by the provision of a thermal printer which, according to a first aspect of the invention, comprises: a platen roller for driving a recording sheet in a sheet feeding direction; and a thermal line head having its sheet receiving side engaged with a shaft at the center of its width in such a manner that it is horizontally swingable about the shaft thereby to prevent the recording sheet from meandering. Furthermore, the object of the invention has been achieved by the provision of a thermal printer which, according to a second aspect of the invention comprises: the above-described thermal line head or an ordinary thermal line head; and a brake shoe provided upstream of the thermal line head in the direction of movement of the recording sheet, for applying a braking frictional force to the recording sheet over its entire width, the brake shoe having its sheet receiving side which is engaged with a shaft perpendicular to the surface of the recording sheet at the center of the width of the recording sheet in such a manner that the brake shoe is swingable about the shaft, thereby to prevent the recording sheet from meandering.

In the thermal printer in which the thermal line head is provided with a mechanism for preventing the recording sheet's meandering, as was described above the thermal line head is horizontally swingable at the center of the width, and the thermal line head is properly pushed against the platen roller through the recording sheet. Therefore, as the recording sheet meander, owing to the frictional force between the thermal line head and the recording sheet the thermal line head together with the recording sheet swings horizontally. As a result, the positional relation between the recording sheet and the thermal line head is maintained unchanged, and accordingly even if a printing operation is carried out while the recording sheet meanders, the resultant print is satisfactory, being not shifted in position. If the thermal line head is shifted to the right or left from its standard position, the frictional force of the recording sheet in the sheet feeding direction causes the thermal line head to return to the standard position; that is, the frictional force provides a restoring force for the thermal line head. The restoring force acts to return the recording sheet to its original position, thus suppressing the meandering operation of the recording sheet.

In the thermal printer with a brake shoe, the brake shoe applies the braking force to the recording sheet over the entire width. When the recording sheet is shifted to one side while meandering, the brake shoe is moved towards the same side because it is horizontally swingable, and since the swing center of the brake shoe is positioned on its sheet receiving side the center of the frictional forces in the sheet feeding direction over the entire width of the recording sheet is shifted towards one side from the swing center, as a result of which a restoring moment toward the brake shoe's original position is formed. The restoring moment thus formed acts to return the recording sheet to its correct position, thus suppressing the meandering operation of the recording sheet.

PREFERRED EMBODIMENTS OF THE INVENTION

Figure 1:
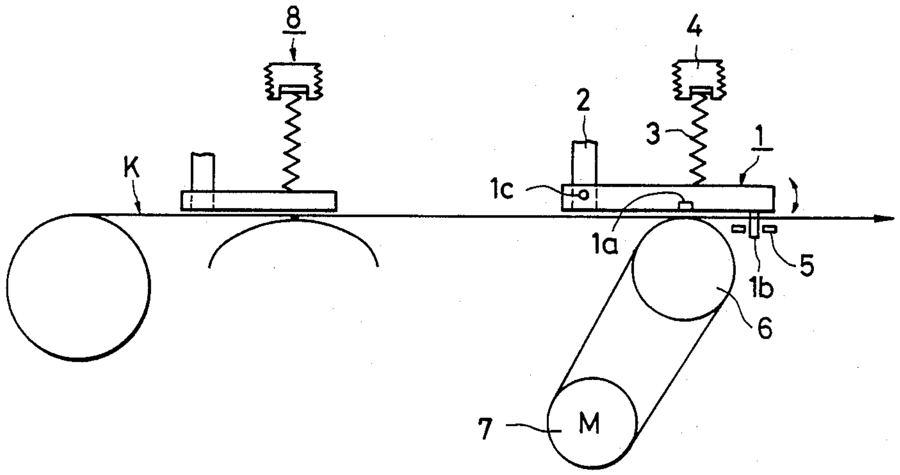
FIGS. 1 and 2 are a side view and a plan view of one example of a thermal printer, respectively, in which the thermal head is equipped with a mechanism for preventing a recording sheet's meandering according to this invention.
Figure 2:
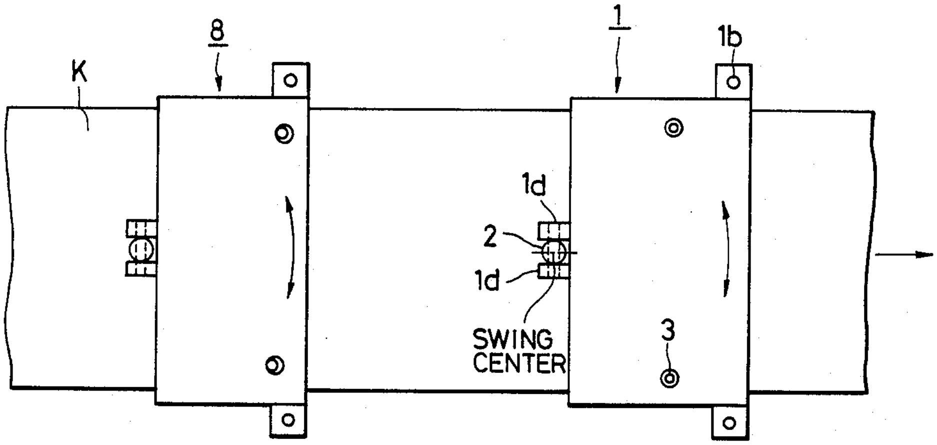

FIGS. 1 and 2 show one example of a thermal printer with a mechanism for preventing a recording sheet's meandering. In FIGS. 1 and 2, reference character K designates a recording sheet, and reference numeral 1 designates a thermal line head.

The head 1 has a heat generating unit la at the position where it contacts a platen roller 6 provided below the head, and a pair of holding members 1*d* protruded backwardly (as viewed in the sheet feeding direction from the middle of the rear end of the thermal line head 1). A holding pin 1*c* is inserted into holes formed in the two holding members 1*d*. One end portion of a holding shaft 2 is supported to a fixed portion (not shown) in such a manner as to be rotatable about the axis perpendicular to the surface of the recording sheet, and therefore the thermal line head is horizontally swingable about the axis of the holding shaft 2. The other end portion of the holding shaft 2 is engaged with the holding pin lc in such a manner that the thermal line head 1 is vertically swingable about the axis of the holding pin 1*c*. Two protrusions are extended from both sides of the front end portion of the head 1, respectively. Two guide pins 1*b* are extended from the lower surfaces of the protrusions thus extended, respectively. The guide pins 1*b* are loose-fitted in guide holes 5 formed in the thermal printer body in such a manner that they do not obstruct the horizontal swinging operation of the head.

Further in FIGS. 1 and 2, reference numerals 3 and 4 designate springs and adjusting screws which are disposed symmetrically on the upper surface of the thermal line head 1 to press the head 1 against the platen roller 6. The pressure applied to the head 1 can be adjusted by operating the adjusting screws 4. The platen roller 6 is rotated through a timing belt or the like by an electric motor 7 to feed the recording sheet K. The sheet feeding speed is slightly higher than the sheet supplying speed so that proper tension is given to the recording sheet at all times. A slip clutch is provided between the drive shaft and the roller so that, when the roller driving force is increased to the extent that excessively large tension is given to the recording sheet, it slips to decrease the driving force.

In the thermal printer thus constructed, a mechanism for preventing a recording sheet's meandering and a printing operation are as follows: As was described above, the thermal line head is swingable horizontally, and is pushed against the recording sheet by means of the springs 3. Therefore, because of the friction between the head 1 and the recording sheet K, the head 1 is swung right and left as the recording sheet K meanders. That is, even if the recording sheet K meander, the horizontal positional relation between the recording sheet and the thermal line head 1 is maintained unchanged, so that the printing operation is carried out correctly at all times.

Figure 3:
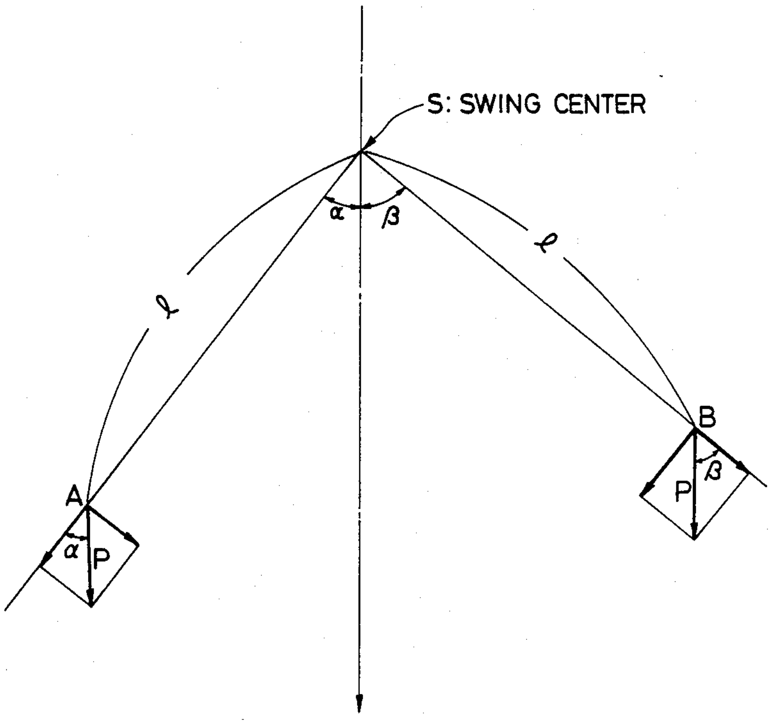
FIG. 3 is an explanatory diagram for explaining the operation of the mechanism for preventing the meandering.

In the case when, as shown in FIG. 3, the recording sheet K is shifted, for instance, to the right, the frictional forces which the recording sheet K applies to the thermal line head 1 at the points A and B which are symmetrical with respect to the center of the width are equal to each other. In this case, the frictional forces are designated by P in FIG. 3. Therefore, the frictional forces P act, as torque with respect to the swing centers, on the thermal line head 1 as follows: If it is assumed that lines SA and SB form angles $\alpha$ and $\beta$ ($\alpha<\beta$) with the direction of movement of the recording sheet K, and SA=SB=l, then the torque at the point A is Pl sin $\alpha$, and the torque at the point B is Pl sin $\beta$. Therefore, the torque given to the thermal line head 1 by the two points A and B is (Pl sin $\beta$−Pl sin $\alpha$). This force is produced over the entire width of the recording sheet K. These forces are all restoring forces for swinging the thermal line head 1 clockwise about the swinging axis or returning it to the left. Thus, even if the recording sheet meanders, the restoring forces act to return the thermal line head 1 to its standard position at all times, whereby a force for returning the recording sheet K to its standard position acts on the recording sheet K, thus suppressing the meandering operation.

According to this invention, a braking unit 8 may be provided upstream of the printing section (on the left-handed side of FIG. 1) to apply a braking force in the direction of movement of the recording sheet. Similarly as in the above embodiment of the thermal line head, the braking unit 8 is also swingable horizontally, so that, when the recording sheet meanders, restoring forces are given to the recording sheet, thus suppressing the meandering of the recording sheet in cooperation with those of the thermal line head.

Figure 4:
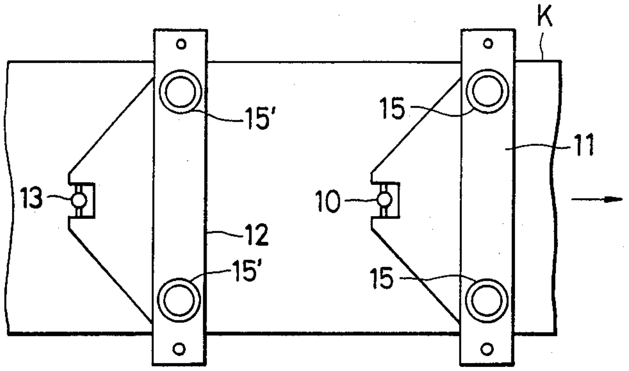
FIGS. 4 and 5 are a plan view and a side view showing essential components of one example of a thermal printer, respectively, in which a brake shoe having a mechanism for preventing the recording sheet's meandering is provided in addition to a thermal line head.

FIGS. 4 though 7 shows examples of a thermal printer equipped with a brake shoe having a mechanism for preventing a recording sheet's meandering. The thermal printer of FIG. 4 has the thermal line head with the mechanism for preventing the recording sheet's meandering, and the brake shoe. However, this invention is not limited to such a construction. For example, the combination of the brake shoe for preventing the recording sheet from meandering and an ordinary thermal line head may be employed in this invention.

Figure 5:
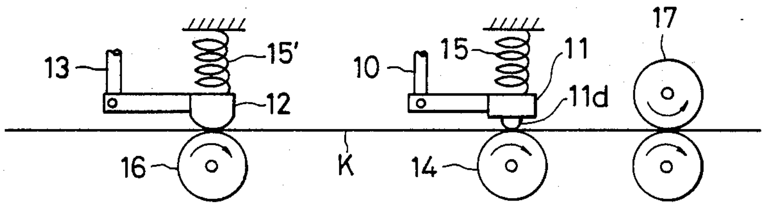

In FIG. 4, reference character k designates an elongated heat sensitive sheet which is fed in the direction of the arrow (to the right in FIG. 4), and reference numerals 11 and 12 designate a thermal line head and a brake shoe, respectively. The brake shoe 12 is located upstream of the thermal line head 11 (on the left-handed side of the FIG. 4) and is so designed that it is horizontally (in a plane in parallel with the surface of the drawing) swingable about a vertical shaft 13 provided at the center of the width of the sheet. As shown in FIG. 5, a platen roller 14 is disposed below the heat sensitive sheet K and below the heat generating element array of the thermal line head. The thermal line head 11 is urged by springs 15 so as to abut against the platen roller 14 through the sheet K. Similarly, a drive roller 16 is disposed below the brake shoe 12, and the latter 12 is abutted against the drive roller 16. A pair of drawing rollers 17 are provided downstream of the thermal line head 11 (on the right-handed side of FIG. 5). More specifically, the rollers 17 are disposed on both sides of the sheet K, respectively, to draw the sheet K to the right in FIG. 5. If the platen roller 14 is so designed as to move in the sheet feeding direction thereby to draw the sheet, then the rollers 17 may be eliminated. The platen roller 14, the drive roller 16 and the drawing rollers 17 are driven with a timing belt.

Figure 6:
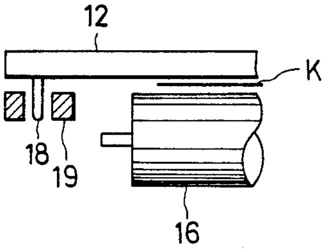
FIG. 6 is a front view showing essential components of the brake shoe.

As shown in FIG. 6, guide pins 18 are embedded in the two end portions of the brake shoe 12, respectively, which are located outside the sheet. The guide pins 18 are loose-fitted in guide holes 19, respectively, to limit the range of swing of the brake shoe. This is to prevent the brake shoe from being excessively swung when the top portion of the recording sheet is supplied to the thermal line head or the printer is moved.

Figure 7:
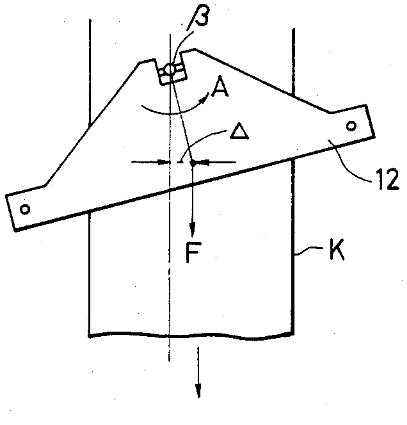
FIG. 7 is an explanatory diagram for explaining the operation of the shoe brake.

It is assumed that, in the thermal printer thus constructed, the sheet K meanders to shift to the right as much as a distance Δ, as shown in FIG. 7. In this case, there is no lateral slip between the sheet and the brake shoe 12, and the brake shoe 12 is swingable about the vertical shaft 13, and therefore the brake shoe 12 swings as shown in FIG. 7, while the center of the frictional force F acting on the entire width of the sheet in the direction of movement of the sheet is displaced by the distance Δ from the central axis of the sheet. Therefore, a restoring moment of ΔF is produced in the brake shoe 12 in the direction opposite to the direction of the arrow A in FIG. 7, thus acting to return the sheet to its correct position.

In the case where the thermal line head with the mechanism for preventing the meandering is employed, similarly as in the above-described bake shoe 12 the thermal line head 11 is so designed that it is horizontally swingable about a vertical shaft 10 which is located at the center of its width and on its sheet receiving side. Therefore, as the sheet K meanders, the thermal line head 11 swings right and left, thereby to prevent the displacement of a print pattern and to give a restoring force to the sheet K to return it to its correct position, thus assisting the brake shoe to suppress the meandering operation more effectively.

According to the invention, the thermal line head is made swingable about the shaft perpendicular to the surface of the recording sheet which is located on its sheet receiving side and at the center of its width. Therefore, the thermal printer can be reduced in manufacturing cost and it can print correctly even if the recording sheet meanders; that is, the printing operation can be achieved with high accuracy at all times. Furthermore, the difficulty that the thermal line head must be spaced away from the platen roller whenever a recording sheet is fed thereto is eliminated according to the invention. This means an improvement of the printing speed. The structure of the invention is such that the recording sheet is not forcibly prevented from meandering, and instead, it is permitted to meander to some extent and the restoring force is utilized to suppress the meandering operation. Therefore, no excessively large force is applied to the recording sheet, and the sheet will never be creased. Furthermore, for the same reason, in the pin feed system, no pin holes are damaged.

In the case where the brake shoe with the above mechanism is employed in addition to the thermal line head with the above mechanism or the ordinary thermal line head, the braking force is applied to the heat-sensitive sheet in the direction opposite to the sheet feeding direction on the sheet receiving side of the thermal line head, and the brake shoe is so designed that it is swingable about the shaft perpendicular to the surface of the heat-sensitive sheet. That is, being simple in construction, the brake shoe swings right and left as the heat-sensitive sheet meanders. Therefore, the provision of the brake shoe according to the invention eliminates the difficulties that when the meandering operation of the recording sheet is forcibly stopped, the recording sheet may be creased, or in the case of a recording sheet having feeding perforations, the feeding perforations may be broken, and the difficulties that, because of the recording sheet thus creased or the feeding perforations thus broken, the print is unsatisfactory or the recording sheet is caught in the thermal printer. Furthermore, when the heat-sensitive sheet meander, the mechanism of the invention produces the restoring force to return the sheet to its correct position, thus suppressing the meandering operation.

What is claimed is:

1. A thermal printer, comprising:

a thermal line head;

a platen roller driven in a sheet feeding direction; and a first shaft held perpendicular to the surface of a recording sheet so as to be rotatable about the axis of said first shaft, said first shaft being engaged with said thermal line head in such a manner that said thermal line head is horizontally swingable about the axis of said first shaft.

2. A thermal printer as claimed in claim 1, wherein said first shaft is engaged with said thermal line head at the center of the rear end of said thermal line head in such a manner that said thermal line head is horizontally and vertically swingable about the engaging position of said first shaft with said thermal line head.

3. A thermal printer as claimed in claim 1, wherein said thermal line head has a pair of holding members protruded backwardly in the sheet feeding direction from the center of the rear end of said thermal line head and a holding pin inserted into holes formed in said holding members, one end portion of said first shaft engaged with said holding pin in such a manner that said thermal line head is horizontally swingable about the axis of said first shaft, and vertically swingable about the axis of said holding pin.

4. A thermal printer as claimed in claim 1, said thermal printer further comprises adjusting means for pressing said thermal line head against said platen roller to adjust the pressure applied to said thermal line head.

5. A thermal printer as claimed in claim 4, wherein said adjusting means comprising a screw and a spring having one end thereof fixed to said screw and the other end fixed to said thermal line head.

6. A thermal printer as claimed in claim 1, said thermal printer further comprising a brake shoe arranged upstream of said thermal line head in the direction of movement of said recording sheet, and second shaft held perpendicular to the surface of said recording sheet so as to be rotatable about the axis of said second shaft, said second shaft being engaged with said brake shoe at the center of the width of said recording sheet in such a manner that said brake shoe is horizontally swingable about the axis of said second shaft.

7. A thermal printer as claimed in claim 1, wherein said thermal line head includes guide means downwardly extended from both sides of the front end portion of said thermal line head, said guide means being engaged with guide holes formed in the thermal printer body in such a manner that said guide means has no obstruction to the horizontal swinging operation of said thermal line head.

* * * * *